Figure 1:
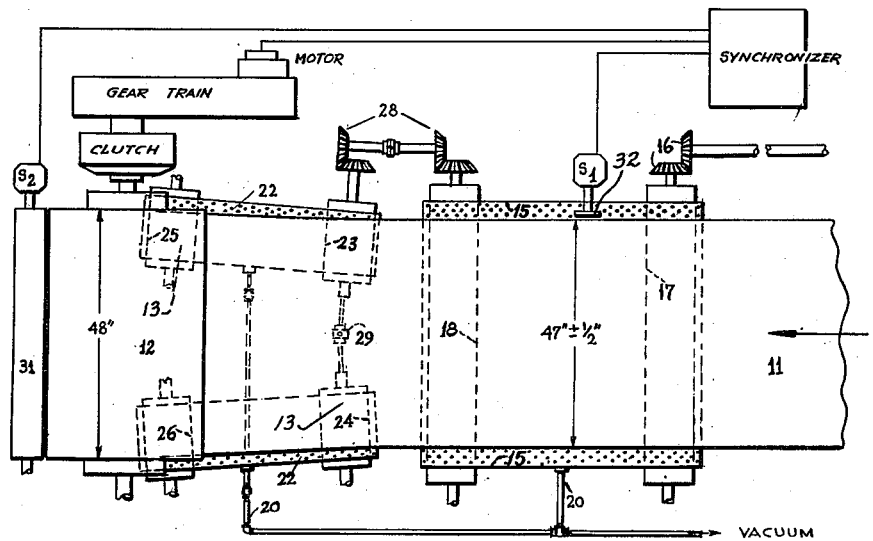

May 27, 1952     W. E. LE CLAIR     2,597,877

WEB HANDLING DEVICE

Filed Sept. 4, 1946

Willis E. LeClair     Inventor

By Milton Zucker

Attorney

Patented May 27, 1952

2,597,877

UNITED STATES PATENT OFFICE 2,597,877

WEB HANDLING DEVICE

Willis E. Le Clair, Peekskill, N. Y., assignor to Interchemical Corporation, New York, N. Y., a corporation of Ohio Application September 4, 1946, Serial No. 694,719

2 Claims. (Cl. 271—2.1)

This invention relates to machinery specially designed for the handling of readily distensible material, such as plasticized vinyl foil and the like, and aims to provide methods and equipment which will deliver wrinkle-free webs of controlled dimensions.

The commercialization of many materials which are most economically handled in large webs has been retarded by the difficulties encountered in handling such webs. Coated photographic paper for example, which is readily distensible when moist, is cut up into sheets for processing after exposure to avoid wrinkling and distortion. Webs of metallic foil must be supported by relatively rigid webs of paper in processing and winding. It is, however, the newer materials, such as plasticized vinyl foil, which have been most troublesome.

These materials are extremely susceptible to applied forces, tending to stretch and to extend in area under their influence. Since many of these materials are of low or sluggish resiliency, they become distorted very easily, and wrinkles and creases are imparted to such webs. Longitudinal tensile forces, which appear either collaterally to the handling or which are applied for moving or winding, frequently effect a "pull-down" or narrowing in width and may be the cause of lengthwise wrinkling, even though these forces be of a very low order.

These untoward effects, which are encountered in core-winding of manufactured goods, in passing the material through processing machines and in rewinding the finished products, may seriously lower the production, cause losses through an excessive rate of rejections and may altogether exclude the use of webs of this character for specific purposes, such as printing of accurate geometric designs, multicolor printing, or photo reproduction, where avoidance of distortion is essential.

In experimenting with the printing of plasticized vinyl foil on a large scale, for the production of table cloths, shower curtains, and the like, it was observed that all the rolls of material, obtained from the manufacturer, were wrinkled. In sending the material through printing machinery which gives satisfactory results with paper, fabric and oil cloth, it was found impossible to obtain a satisfactory geometric print. The orientation of the design was destroyed and, in addition, the finished rolls were badly wrinkled and distorted in both, longitudinal and lateral direction.

In efforts to overcome these difficulties, the various expedients used by prior art workers were considered and the most likely were actually tried. Typical of these expedients are rollers that support the entire width of the web, rollers with crowns or herringbone ridges, and fixed or pivoting rollers engaging opposite edges of the web. The necessary friction is usually produced by means of coatings of rubber, cork, and felt, or is obtained by means of nippers and protuberances. Perforate rollers have been made to engage the edges of the web by means of suction. So called tenter chains or belts have been applied, which, progressively diverging, grip the web at its edges by means of pins and nippers or hold the edges frictionally between two parallel members. It is characteristic of the various known devices that, at a given instant, contact between the spreading means and the moving web is not established over any longitudinally extended section of the web, but is restricted to a transverse linear contact or, if contact over an area is made at all, that such contact is generally confined to a relatively small part of the web. It is also typical of many of the known spreading devices, that their forward movement is derived from the traveling web. Others have the disadvantage that the spreading means engage both sides of the material.

I have now discovered that wrinkles, so called "pull-down" or narrowing in width, and also the appearance of curled edges in the handling of distensible webs may be eliminated efficiently by (1) establishing suctional contact between web and spreading means over a substantial area of the web, thereby extending the time of contact for a given point of the moving web, (2) inducing very slight lateral tension which is increased by degrees only, in adjusting the direction of movement of the spreading means at a small angle to the direction of travel taken by the moving web, (3) actuating the rotative movement of the spreading means by a power other than the moving web and coordinating the speed of both, (4) adjusting the friction, exerted by the spreading means upon the web, according to the coefficient of elongation of the specific material, (5) locating the spreading device immediately in advance of the point where lay of the web and accuracy of dimension become imperative, as in the steps of printing or re-winding.

In applying the principles as set forth, a gradual smoothing and/or stretching of the material is accomplished, starting from the middle toward the edges of the web, by sliding the latter obliquely across the face of the stretching means, avoiding rigid gripping, instantaneous lateral pull, and localized tension or drag (such as with frictionally actuated stretching means).

The invention consists in the construction and arrangement of parts described hereinafter and it is to be understood that changes may be made in the described construction without departing from the scope of the invention.

One of the preferred embodiments of the invention is illustrated in the accompanying drawing, in which Figure 1 is a plan view of a device suitable for practicing my invention in the handling of, for instance, plasticized vinyl foil.

Figure 2:
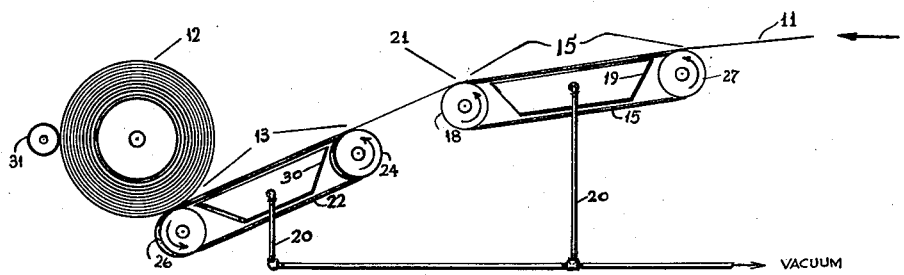

Figure 2 is a side elevation.

Referring to the drawing, 11 represents a foil or web, moving, in the direction of the arrow, toward a batch winder 12. While it may suffice, in some cases, to lead the moving web over a roller or any other suitable guide immediately before it reaches the spreading device 13, with vinyl foil, for instance, it is a required part of the invention to carry the web, prior to the spreading, through or over means whereby a certain back-tension is produced against the batch winder in order to obtain an efficient stretching effect. Whereas a frictionally operating roller pair may sometimes be suitable for this purpose, I prefer to employ a suctionally operating guide blanket 15, consisting of an endless, perforate rubber sheet, which is rotatively driven, (in the instant case from a printing machine located in advance to the spreading device), by means of gears 16, attached to member 17 of the roller pair 17, 18. In operation, the upper portion of the rotating rubber sheet glides over a suction box 19, to which vacuum is applied through the pipe assembly 20, leading to a vacuum pump or any other suitable means of exhausting air. Impulses of any change in the speed of this guide blanket are transmitted to selsyn S1, and from there to a synchronizer by means of a roller 32 which rides on the guide blanket.

The present embodiment illustrates handling a plasticized vinyl foil of an original width of 48 inches. Under the influence of longitudinal stretches in processing, the foil has however, suffered not only an appreciable reduction in overall width, which in the present case may amount to one inch and more, but is also impaired by wrinkles or ridges, due to uneven tension which may have been exerted upon the web, or to differences in tensile strength at various points of the material. These wrinkles, running lengthwise with the web, not only reduce still further the apparent width of the lay, but tend to interfere seriously with a subsequent rewinding, in that these wrinkles become sharp creases within the roll while the edges of the wound-up web show a distorted, non-uniform overlay.

From the guide blanket 14, which is incapable of removing wrinkles and the main purpose of which consists in creating back-tension against the slightly faster moving batch roller, the web is carried, preferably over a break in the plane of travel at 21 (by increasing the angle of descent of the web), onto the spreading device 13, consisting of a pair of endless, perforate rubber belts 22, which are rotatively actuated by means of the two roller pairs 23, 24 and 25, 26. The roller 23 is connected with and driven from roller 18 of the guide blanket by means of gear 28 and moves the roller 24, by means of the drive shaft 29 (which may be a flexible shaft or one having a universal joint). While in rotation, the upper portion of the perforate rubber belts slide across the opening suction boxes 30, which are connected with a suitable vacuum device through the previously mentioned pipe assembly 20.

The two members of the spreading device, while supporting opposite sections of the web, diverge forwardly from the direction of travel of the material and, since their rotative movement is actuated by a power other than the moving web and in a direction only slightly divergent from the path of the latter, there is no drag exerted upon the web and only such friction as is needed to produce a gradually increasing lateral stretch.

Since the spreading means must be set at an acute angle relative to the direction of travel of the web, in order to fulfill the requirements of a gradual increase in lateral tension, the length of the vacuum belts 22 will be determined by the degree of divergency and by the time of contact which is needed to produce a lateral stretch of the desired magnitude. The width of these belts, depending primarily upon the obliqueness at which the web will slide across their face, may also be influenced by the amount of transverse support, which the web will require during the stretching action. Difficulties may be encountered in carrying the smoothing or stretching effect clear to the edges of the web if the belts are too wide and it may be advisable, in this case, to restrict the vacuum action to an area adjacent to the outer edges of the belts. In handling this specific vinyl foil, vacuum belts, set at angles of 5° and each providing a contact surface of 36 x 6 inches (thus supporting about one-fourth of the area of the web under stretch) were found to be adequate.

As the web leaves the spreading device, now free of wrinkles and restored to its original width, it is immediately core-wound on the batch-winder 12. In order to regulate the speed of the batch-winder, which must be set at such a rate as to keep a slight longitudinal tension on the web while it is being stretched laterally, a rider roller 31 is provided, making frictional contact with the surface of the roll of wound-up material. This rider roller communicates, through selsyn S2, impulses of changes in the surface speed of the roll to the synchronizer which, in response to the combined impulses of selsyn S1 and selsyn S2, coordinates the speed of batch-winder 12 to the rate of travel of guide blanket 14 and spreader 13 by adjusting the speed of the driving mechanism of the former.

In describing one specific use of my invention, I do not intend to limit it to one task or to one particular material. It is applicable for various other purposes and with materials of a widely different nature and may be employed in maintaining or improving the lay of traveling webs in connection with printing, coating, or laminating.

It may be applied to various impervious materials, but most advantageously to distensible webs, which are jeopardized by surface distortion.

What I claim and desire to secure by Letters Patent is:

1. In a web handling device, perviously surfaced endless belts supporting opposite side sections of the moving web, said belts being arranged to diverge outwardly at a small angle from the forward course of travel of the web, a perviously surfaced endless guide blanket in support of the entire width of the web placed ahead of said endless belts, means for maintaining a vacuum underneath the web-engaging parts of said guide blanket and said endless belts, means for advancing said web, and means for advancing said guide blanket and said endless belts independently of the moving web and at a speed substantially equal to the rate of travel of said web.

2. In a web handling device, perviously surfaced endless belts supporting opposite side sections of the moving web, said belts being arranged to diverge outwardly at a small angle from the forward course of travel of the web, a perviously surfaced endless guide blanket in support of the entire width of the web placed ahead of said endless belts, means for maintaining a vacuum underneath the web-engaging parts of said guide blanket and said endless belts, means for advancing said web, and means for advancing said guide blanket and said endless belts independently of the moving web and at a speed lower than the rate of travel of said web.

WILLIS E. LE CLAIR.

REFERENCES CITED

The following references are of record in the file of this patent:

UNITED STATES PATENTS

| Number | Name | Date |
| --- | --- | --- |
| 236,068 | Newcomb | Dec. 28, 1880 |
| 478,255 | Edwards et al. | July 5, 1892 |
| 1,288,643 | Mayer | Dec. 24, 1918 |
| 1,891,782 | Sager | Dec. 20, 1932 |
| 2,066,872 | Adams et al. | Jan. 5, 1937 |
| 2,184,744 | Jonassen | Dec. 26, 1939 |
| 2,348,162 | Warner | May 2, 1944 |
| 2,398,822 | Faris et al. | Apr. 23, 1946 |
| 2,434,111 | Hawley | Jan. 6, 1948 |